United States Patent
Nakachi (10) Patent No.: US 10,061,251 B2
(45) Date of Patent: Aug. 28, 2018

(54) IMAGE FORMING APPARATUS AND IMAGE FORMING SYSTEM

(71) Applicant: KYOCERA Document Solutions Inc., Osaka (JP)

(72) Inventor: Kazuhiro Nakachi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/784,295

(22) Filed: Oct. 16, 2017

(65) Prior Publication Data

US 2018/0120747 A1     May 3, 2018

(30) Foreign Application Priority Data

Oct. 31, 2016    (JP) ................................ 2016-213829

(51) Int. Cl.
| | |
|---|---|
| *G03G 15/00* | (2006.01) |
| *G06F 3/12* | (2006.01) |
| *H04L 29/08* | (2006.01) |

(52) U.S. Cl.
CPC ....... *G03G 15/553* (2013.01); *G03G 15/5004* (2013.01); *G03G 15/5079* (2013.01); *G06F 3/1229* (2013.01); *H04L 29/08567* (2013.01)

(58) Field of Classification Search
CPC ............. G03G 15/553; G03G 15/5004; G03G 15/5079
See application file for complete search history.

(56) References Cited

U.S. PATENT DOCUMENTS

| | | |
|---|---|---|
| 8,385,753 B2 | 2/2013 | Arai |
| 9,967,413 B2 * | 5/2018 | Hirama ............... H04N 1/00344 |
| 2010/0150581 A1 * | 6/2010 | Nakamura ............. G03G 15/55 |
| | | 399/18 |
| 2011/0052218 A1 | 3/2011 | Arai |

FOREIGN PATENT DOCUMENTS

JP         2011-048015 A      3/2011

* cited by examiner

*Primary Examiner* — David M Gray
*Assistant Examiner* — Andrew V Do
(74) *Attorney, Agent, or Firm* — Studebaker & Brackett PC (57) ABSTRACT

An image forming apparatus includes a controller, a transmitter, a receiver, and an input receiving device. Upon the controller detecting a replacement unit that needs to be replaced, the transmitter transmits, to an external device, unit information indicating the replacement unit. The receiver receives, from the external device via a network, replacement procedure information of the replacement unit detected by the controller and identification information of a worker who is to replace the replacement unit. Upon the input receiving device receiving input of identification information that matches the identification information of the worker received by the receiver, the controller shifts an operation state of the image forming apparatus from a normal power supply mode to a unit replacement mode in which power is supplied only to predetermined components of the image forming apparatus other than the replacement unit.

7 Claims, 5 Drawing Sheets

IMAGE FORMING APPARATUS AND IMAGE FORMING SYSTEM

INCORPORATION BY REFERENCE

The present application claims priority under 35 U.S.C. § 119 to Japanese Patent Application No. 2016-213829, filed on Oct. 31, 2016. The contents of this application are incorporated herein by reference in their entirety.

BACKGROUND

The present disclosure relates to an image forming system including image forming apparatuses for forming images on paper and a server connected with the image forming apparatuses via a network.

An image forming apparatus includes a plurality of units (devices). The units for example include a drum unit and a belt unit. The drum unit and the belt unit need to be replaced because of for example lifetime once the number of sheets printed using the units or the driving time of the units has exceeded a specific level. A worker from the manufacturer performs maintenance and management such as replacement of a unit that has reached the end of its lifetime. Thus, the image forming apparatus can continue to be used to form images without experiencing deterioration in quality of the images.

Typically, each unit has non-volatile memory (for example, electrically erasable programmable read-only memory (EEPROM)) for recording unit-specific information such as a control number and the number of printed sheets. If a unit is replaced while power supply to the unit is maintained, over voltage may occur upon attachment or detachment of the unit, damaging a component of the unit such as the EEPROM. Furthermore, work efficiency of the worker may be reduced.

Replacement of a unit can be carried out without concerns of over voltage and electrical shock so long as the image forming apparatus as a whole is turned off. However, this is inconvenient because a replacement procedure cannot be displayed on a monitor or the like, and an instruction manual needs to be prepared for a complicated replacement procedure.

In one example, for replacement of a unit of an image forming apparatus, the image forming apparatus shifts from a normal power supply mode to a component replacement power supply mode through a worker manually shifting the mode of the image forming apparatus using an operation section. In the normal power supply mode, power is supplied to the entire image forming apparatus. In the component replacement power supply mode, power supply is performed in a different manner than in the normal power supply mode so that an operator can replace a component. Thus, it is possible to reliably perform unit replacement while improving work efficiency of the worker.

SUMMARY

An image forming apparatus according to an aspect of the present disclosure forms an image on paper. The image forming apparatus includes a controller, a transmitter, a receiver, an input receiving device, and an informing device. The controller detects a replacement unit from among units included in the image forming apparatus. The replacement unit is a unit that needs to be replaced. The transmitter transmits, to an external device, unit information indicating the replacement unit upon the controller detecting the replacement unit. The receiver receives, from the external device via a network, replacement procedure information of the replacement unit detected by the controller and identification information of a worker who is to replace the replacement unit. The input receiving device receives input of identification information of a user. Upon the input receiving device receiving input of identification information that matches the identification information of the worker received by the receiver, the controller shifts an operation state of the image forming apparatus from a normal power supply mode to a unit replacement mode. The normal power supply mode is a mode in which power is supplied to the entire image forming apparatus. The unit replacement mode is a mode in which power is supplied only to predetermined components of the image forming apparatus other than the replacement unit. The controller causes the informing device to inform how to replace the replacement unit based on the replacement procedure information.

An image forming system according to another aspect of the present disclosure includes a plurality of image forming apparatuses that form images on paper and a server connected with the image forming apparatuses via a network. Each of the image forming apparatuses includes a controller, an apparatus transmitter, an apparatus receiver, an apparatus input receiving device, and an informing device. The controller detects a replacement unit from among units included in the image forming apparatus. The replacement unit is a unit that needs to be replaced. The apparatus transmitter transmits, to the server, unit information indicating the replacement unit upon the controller detecting the replacement unit. The apparatus receiver receives, from the server, replacement procedure information of the replacement unit detected by the controller and identification information of a worker who is to replace the replacement unit. The apparatus input receiving device receives input of identification information of a user. Upon the apparatus input receiving device receiving input of identification information that matches the identification information of the worker received by the apparatus receiver, the controller shifts an operation state of the image forming apparatus from a normal power supply mode to a unit replacement mode. The normal power supply mode is a mode in which power is supplied to the entire image forming apparatus. The unit replacement mode is a mode in which power is supplied only to predetermined components of the image forming apparatus other than the replacement unit. The controller causes the informing device to inform how to replace the replacement unit based on the replacement procedure information. The server has a server receiver and a server transmitter. The server receiver receives unit information of the replacement unit from the image forming apparatus. The server transmitter transmits, to the image forming apparatus, the replacement procedure information of the replacement unit and the identification information of the worker who is to replace the replacement unit.

DETAILED DESCRIPTION

The following describes an image forming apparatus and an image forming system according to an embodiment of the present disclosure with reference to the drawings. Although the present embodiment is described using an electrophotographic image forming apparatus as an example, the image forming apparatus may be of another printing process such as an inkjet image forming apparatus. The present disclosure is applicable to any image forming apparatuses including a unit that has a lifetime and eventually needs to be replaced. The term "unit" refers to a device that fulfills a specific function.

Figure 1:
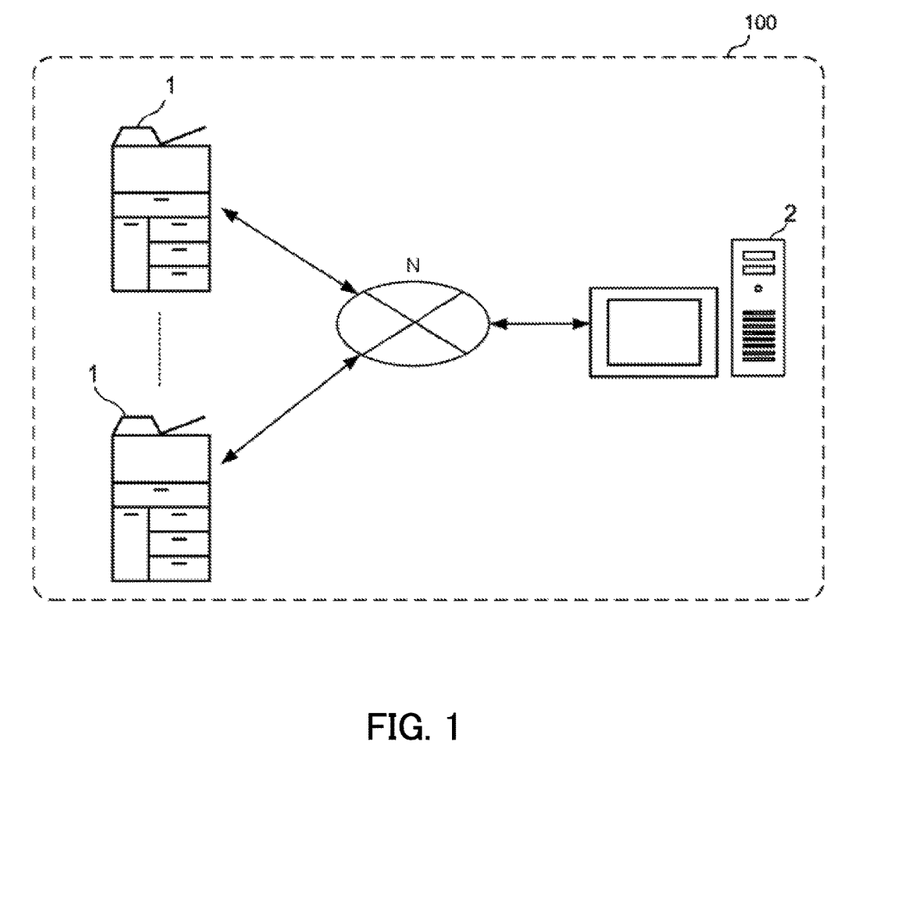
FIG. 1 is a conceptual diagram of an image forming system according to an embodiment of the present disclosure.

FIG. 1 is a conceptual diagram of an image forming system 100. The image forming system 100 includes a plurality of image forming apparatuses 1 and a server 2. Each image forming apparatus 1 is connected with the server 2 via a network N.

The image forming apparatus 1 prints an image on paper based on printing data. The image forming apparatus 1 is for example a copier that has a scanner, a printer that performs printing based on printing data transmitted from another device such as a personal computer, a facsimile machine that performs printing based on facsimile data transmitted through a telephone line, a multifunction peripheral that has the aforementioned functions, or the like.

The server 2 has a remote maintenance function. The remote maintenance function enables management of an image forming apparatus 1 that is one of the image forming apparatuses 1 connected with the server 2 via the network N and that is pre-registered as a management target. More specifically, the remote maintenance function allows the server 2 to acquire a state of the image forming apparatus 1 via the network N and remotely perform operations such as software update in the image forming apparatus 1. The remote maintenance function therefore allows a worker (service personnel) from a manufacturer to grasp the state of the image forming apparatus 1 without visiting the place where the image forming apparatus 1 is located. The manufacturer can promptly know any defect in the image forming apparatus 1 by using the remote maintenance function. Accordingly, the manufacturer can swiftly perform maintenance and management such as replacement of a unit. As a result, the manufacturer can improve the service to users.

Figure 2:
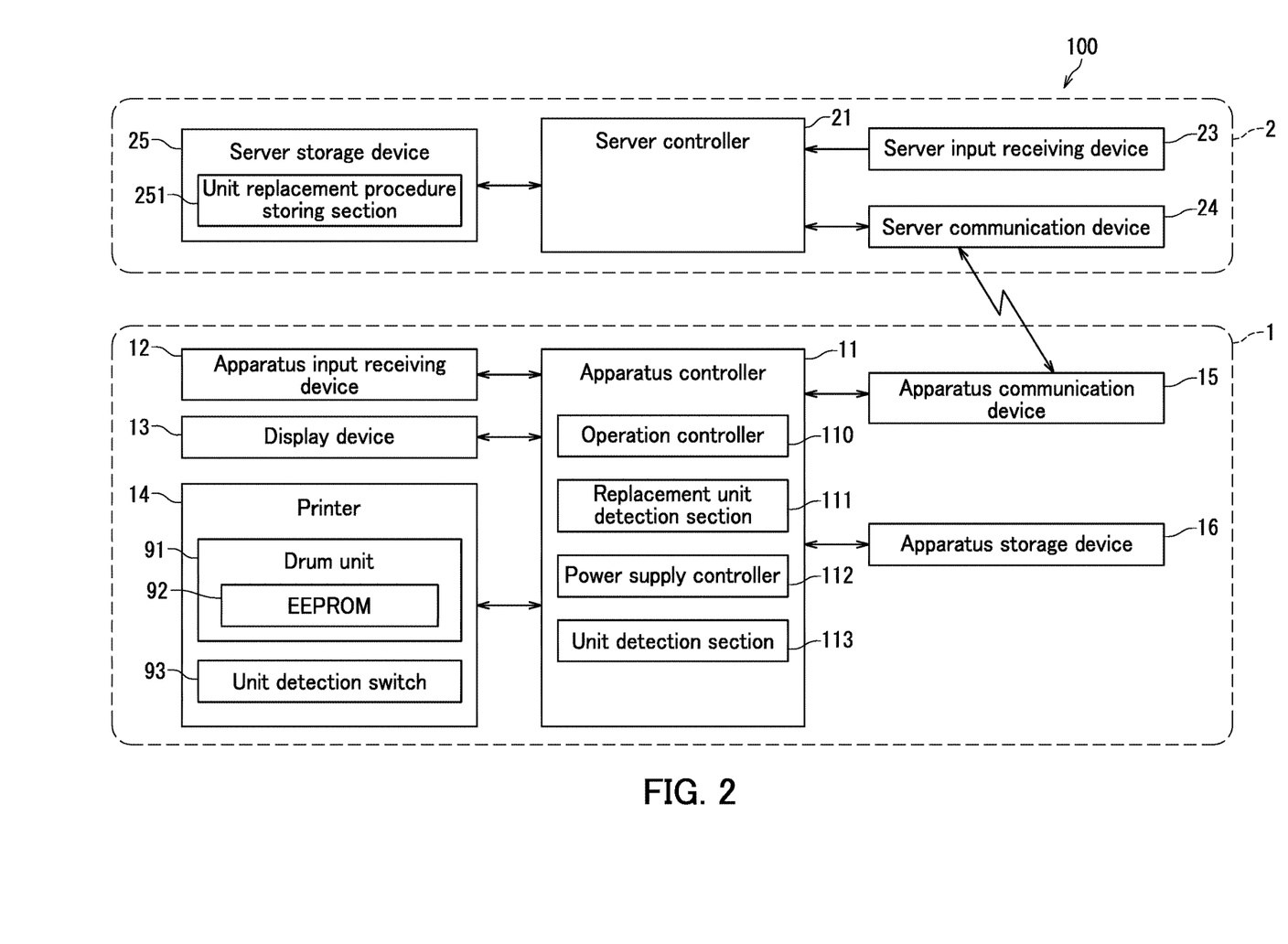
FIG. 2 is a block diagram illustrating a configuration of an image forming apparatus and a server according to the embodiment.

FIG. 2 is a block diagram illustrating a configuration of each image forming apparatus 1 and the server 2. The image forming apparatus 1 includes an apparatus controller 11, an apparatus input receiving device 12, a display device 13, a printer 14, an apparatus communication device 15, and an apparatus storage device 16. The display device 13 and the printer 14 are an example of what may be referred to as an informing device. The apparatus communication device 15 is an example of what may be referred to as an apparatus receiver and an apparatus transmitter.

The apparatus input receiving device 12 for example includes either or both of hard keys and a touch panel described below to receive instructions from a user regarding various operations and processes that can be executed by the image forming apparatus 1. The apparatus input receiving device 12 also receives input of unique identification information that is input when a worker or a user uses the image forming apparatus 1.

The display device 13 includes a display such as a liquid crystal display (LCD) or an electronic luminescent display (ELD) and displays various messages to a user or operation screens. The display device 13 may be integral with a touch panel (not shown). Upon a user performing a touch operation (a touch on the touch panel), the touch panel (the apparatus input receiving device 12) detects a position of the touch and outputs a detection signal to the apparatus controller 11, which is described below.

The printer 14 forms an image on paper based on printing data transmitted from an external device such as a personal computer. Alternatively, in a configuration in which the image forming apparatus 1 includes a scanner, the printer 14 prints an image on paper based on image data read by the scanner. The printer 14 according to the present embodiment includes a light exposure device, a charger, a drum unit 91, a developing device, and a transfer device. The drum unit 91 includes (is provided with) a photosensitive drum and EEPROM 92, which is a type of non-volatile memory.

The printer 14 further includes a unit detection switch 93. The unit detection switch 93 outputs a signal indicating whether or not each unit is in an attachment position thereof in the image forming apparatus 1. Hereinafter, the unit may be described as "present" when the unit is in the attachment position in the image forming apparatus 1, and the unit may be described as "absent" when the unit is not in the attachment position in the image forming apparatus 1.

The apparatus communication device 15 is an interface circuit that performs data communication with the server 2 via a network such as the Internet or a telephone line.

The apparatus storage device 16 is for example non-volatile semiconductor memory. Alternatively, the apparatus storage device 16 is a storage device including either or both of a hard disk drive (HDD) and a solid state drive (SSD). Data and programs necessary for operation of the image forming apparatus 1 are stored in the apparatus storage device 16.

The apparatus controller 11 includes: a processor such as a central processing unit (CPU) and a microprocessing unit (MPU); and an integrated circuit such as an application-specific integrated circuit (ASIC) and a field programmable gate array (FPGA). The apparatus controller 11 functions as an operation controller 110, a replacement unit detection section 111, a power supply controller 112, and a unit detection section 113 through reading and execution of various programs stored in the apparatus storage device 16.

The operation controller 110 for example outputs indication signals and transmits data to the sections connected with the apparatus controller 11. Through the above, the operation controller 110 performs control of the sections, and thus performs overall operation control of the image forming apparatus 1.

The replacement unit detection section 111 detects a unit that needs to be replaced from among the units included in the image forming apparatus 1. For example, the drum unit 91 and the belt unit are units that have lifetimes. The replacement unit detection section 111 reads information recorded on EEPROM attached to each unit to determine whether or not the unit needs to be replaced. Each unit has its own EEPROM attached thereto. The EEPROM attached to each unit contains information about the unit. The information contained in the EEPROM is for example the number of printed sheets and the driving time. More specifically, the EEPROM 92 attached to the drum unit 91 included in the printer 14 contains unit-specific information such as a control number of the unit, the number of sheets printed using the unit, and the driving time of the unit. Such information is written in the EEPROM by for example the operation controller 110.

In a situation in which the lifetime of the drum unit 91 is supposed to end when for example 10,000 sheets have been printed on, the replacement unit detection section 111 determines that the drum unit 91 needs to be replaced once the number of printed sheets indicated by the information received from the EEPROM 92 exceeds 10,000 to detect the drum unit 91 as a replacement unit, which is a unit that needs to be replaced.

Upon the replacement unit detection section 111 detecting a replacement unit, the apparatus communication device 15 transmits information indicating the replacement unit (for example, ID information for identifying the replacement unit) to the server 2.

The power supply controller 112 switches power supply modes of the image forming apparatus 1 with respect to each unit. More specifically, the power supply controller 112 instructs a power supply circuit (not shown) to switch an operation state of the image forming apparatus 1 between a normal power supply mode and a unit replacement mode. The normal power supply mode refers to a mode in which power is supplied to the entire image forming apparatus 1. The unit replacement mode refers to a mode in which power is supplied to predetermined components other than the replacement unit to be replaced by a worker.

If a unit is replaced while power supply to the unit is maintained, over voltage occurs upon attachment or detachment of the unit. Over voltage may cause damage in components of the unit such as the EEPROM.

Replacement of the unit can be carried out without concerns such as a concern of over voltage so long as the main power supply of the image forming apparatus 1 is turned off. Nowadays, however, image forming apparatuses display on the display device 13 thereof a replacement procedure when a unit is to be replaced. With the main power supply off, the display device 13 is not usable (not able to display the replacement procedure of the unit), which is inconvenient in a situation in which the replacement procedure is complicated.

It is therefore preferable that during the unit replacement mode, power is supplied only to predetermined components (for example, the apparatus input receiving device 12 and the display device 13) other than the replacement unit, and no power is supplied to the replacement unit. The power supply controller 112 according to the present embodiment causes transition of the operation state of the image forming apparatus 1 to switch ranges of power supply. Thus, the replacement unit is prevented from being damaged. As a result of the range of power supply being switched to the predetermined components other than the replacement unit, the work efficiency of the worker can be improved.

The unit detection section 113 determines presence or absence of each unit (whether or not the unit is in a predetermined attachment position in the image forming apparatus 1) based on a signal output by the unit detection switch 93. Hereinafter, this determination is referred to as "unit detection". The following describes the unit detection with reference to FIG. 3 in detail.

Figure 3:
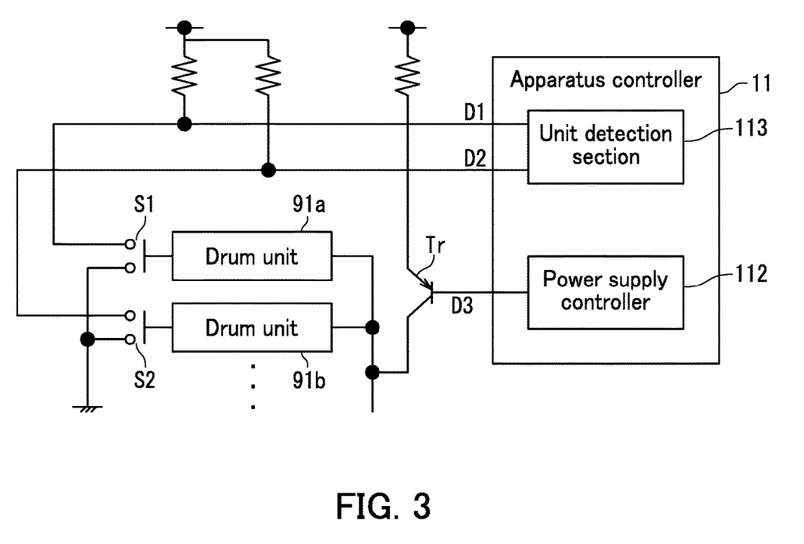
FIG. 3 is a circuit diagram illustrating an example of a configuration of unit detection and power supply to units according to the embodiment.

FIG. 3 is a circuit diagram illustrating an example of a configuration of the unit detection and power supply to units. The description using FIG. 3 takes, as an example, a case where the unit detection section 113 determines presence or absence of two drum units 91. In FIG. 3, the two drum units 91 are shown as a drum unit 91a and a drum unit 91b.

The unit detection section 113 detects presence or absence of the drum units 91a and 91b. More specifically, once the drum unit 91a is attached to its attachment position, a switch S1 is turned on, and a signal line D1 is brought to a low level. Receiving the low signal, the unit detection section 113 detects that the drum unit 91a is in the attachment position. Once the drum unit 91a is detached from the attachment position, the switch S1 is turned off, and the signal line D1 is brought to a high level. Receiving the high signal, the unit detection section 113 detects that the drum unit 91a is not in the attachment position. The relationship between the drum unit 91b and a switch S2 is the same as the relationship between the drum unit 91a and the switch S1 described above. Accordingly, description thereof is omitted.

The power supply controller 112 switches on or off a transistor Tr thereby to control power supply to all drum units including the drum units 91a and 91b. For example, the power supply controller 112 brings the signal line D3 to a low level, and as a result the transistor Tr is turned on, and power is supplied to all the drum units including the drum units 91a and 91b. The power supply controller 112 brings the signal line D3 to a high level, and as a result the transistor Tr is turned off, and power supply to all the drum units including the drum units 91a and 91b is stopped.

Returning to FIG. 2, the server 2 includes a server controller 21, a server input receiving device 23, a server communication device 24, and a server storage device 25. The server controller 21 includes: a processor such as a CPU and an MPU; and an integrated circuit such as an ASIC and an FPGA. The server controller 21 reads out and executes various programs stored in the server storage device 25 to output indication signals and transmit data to various functional sections. Through the above, the server controller 21 performs overall control of the server 2.

The server input receiving device 23 receives instructions from a server administrator regarding various operations and processes that can be executed by the server 2. The server input receiving device 23 also receives input of an identification number of a worker who is to replace the replacement unit upon the server communication device 24 receiving the unit information indicating the replacement unit from the image forming apparatus 1.

Note that the worker who is to replace the replacement unit may be determined for example by a server administrator inputting identification information of a worker through the server input receiving device 23. Alternatively, the worker who is to replace the replacement unit may be determined by the server controller 21 reading out identification information of a worker who meets requirements from the server storage device 25 where identification information of relevant workers are prestored in association with image forming apparatus models and unit types.

The server communication device 24 (an example of what may be referred to as a server receiver and a server transmitter) is an interface circuit that performs data communication with the image forming apparatus 1 via a network such as the Internet or a telephone line.

Various data is stored in the server storage device 25. The server storage device 25 for example includes a storage device such as a hard disk drive (HDD) and semiconductor memory such as random access memory (RAM) and read only memory (ROM). Data and programs that are necessary for operation of the server 2 are stored in the server storage device 25. The server storage device 25 includes a unit replacement procedure storing section 251. Replacement procedure information indicating replacement procedures in text or graphics for the respective unit types is stored in the unit replacement procedure storing section 251. Upon the server communication device 24 receiving a unit replacement request, the server controller 21 reads out the replacement procedure information from the unit replacement procedure storing section 251 based on the unit information, and the server communication device 24 transmits the replacement procedure information to the image forming apparatus 1.

Figure 4:
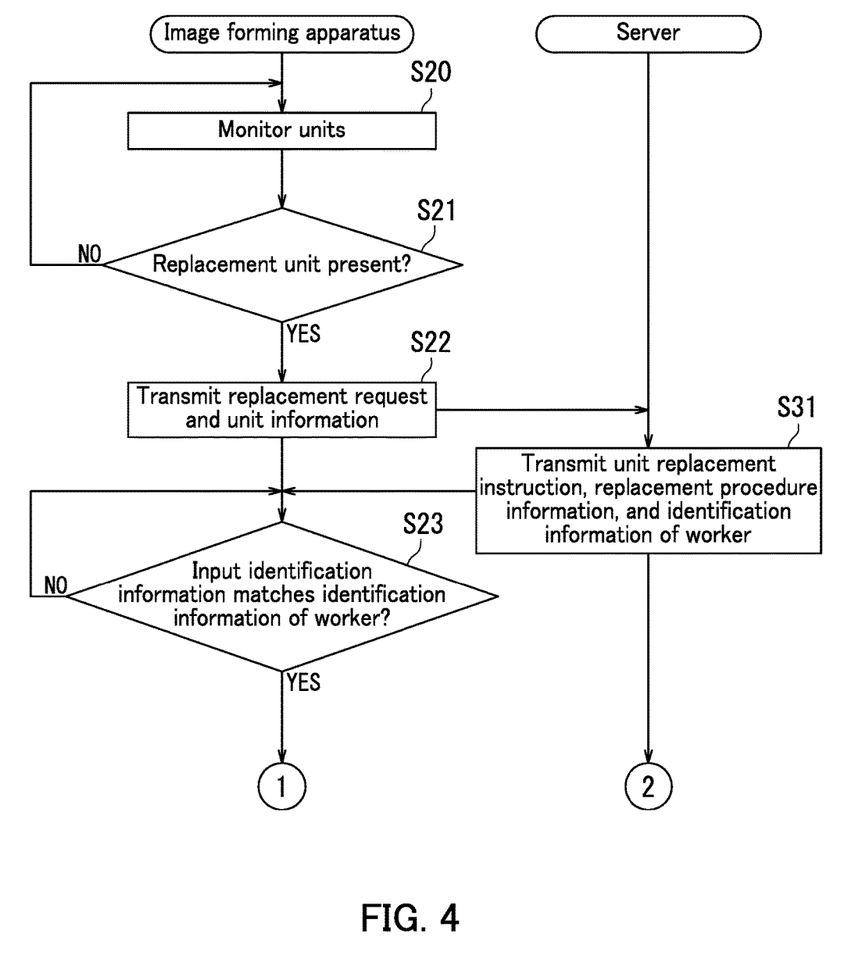
FIG. 4 shows a flowchart illustrating a flow of unit replacement according to the embodiment.
Figure 5:
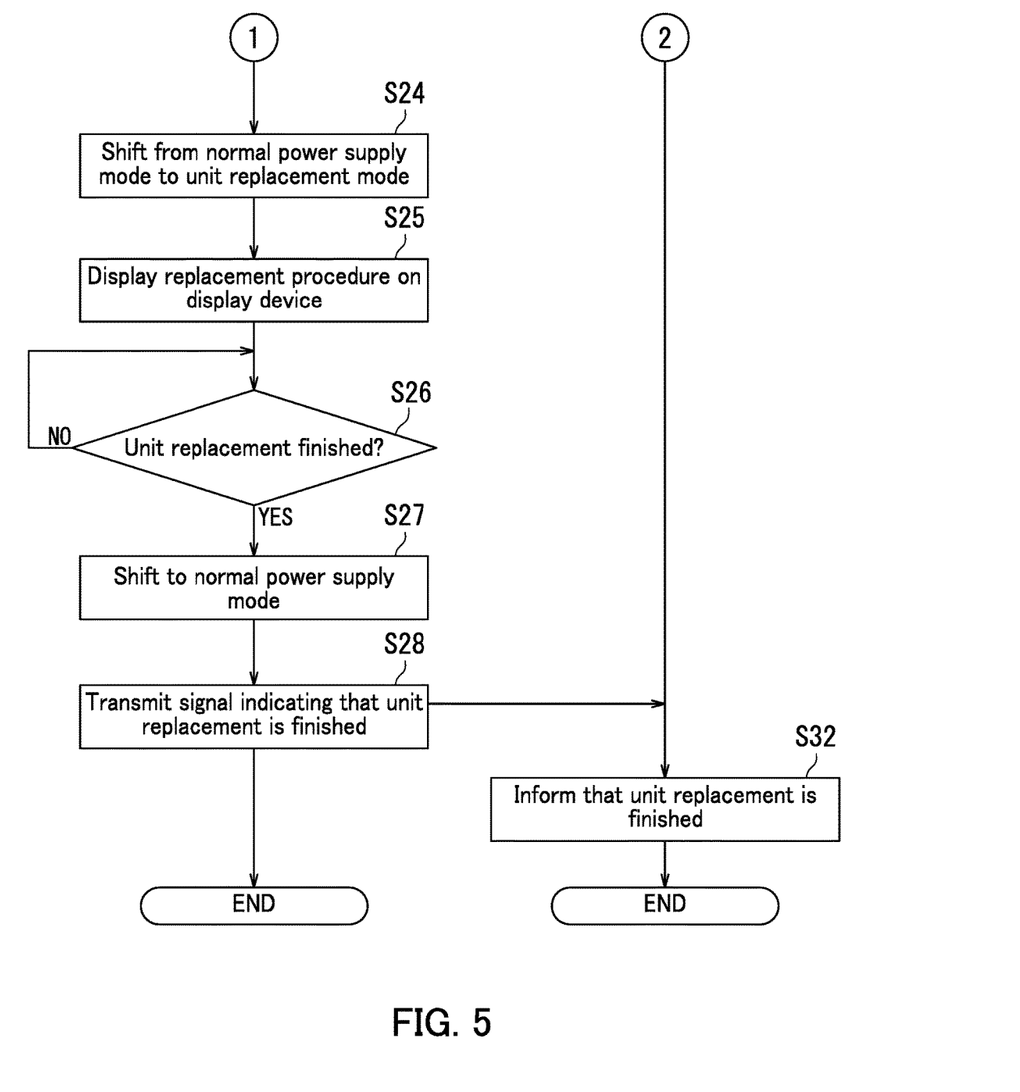
FIG. 5 shows the flowchart illustrating the flow of unit replacement according to the embodiment.

FIGS. 4 and 5 show a flowchart illustrating a flow of unit replacement. The following describes the flow of unit replacement with reference to FIGS. 4 and 5. First, the replacement unit detection section 111 acquires information such as the number of printed sheets and the driving time from the EEPROM attached to units that each have a lifetime among the units included in the image forming apparatus 1 to monitor the units. More specifically, based on the information acquired from the EEPROM attached to each unit, the replacement unit detection section 111 determines whether or not the unit needs to be replaced (Step S20). Upon detection of a replacement unit (YES in Step S21), the apparatus communication device 15 transmits, to the server 2, the unit information acquired from the EEPROM attached to the replacement unit (Step S22).

Upon the server communication device 24 receiving the unit information from the image forming apparatus 1, the server controller 21 reads out the replacement procedure information from the unit replacement procedure storing section 251 based on the unit information. The server communication device 24 then transmits, to the image forming apparatus 1, the replacement procedure information that is read out and the identification information of a worker who is to perform the unit replacement (Step S31).

Upon the apparatus communication device 15 receiving the replacement procedure information and the identification information of the worker from the server 2, the apparatus controller 11 temporarily stores the replacement procedure information and the identification information of the worker in memory (not shown) of the apparatus storage device 16 or the apparatus controller 11.

Thereafter, the worker visits the image forming apparatus 1 for unit replacement and inputs his/her identification information into the apparatus input receiving device 12. In response, the apparatus controller 11 compares the identification information received by the apparatus input receiving device 12 with the identification information of the worker transmitted from the server 2 to determine whether or not the identification information received by the apparatus input receiving device 12 matches the identification information of the worker transmitted from the server 2 (Step S23).

Upon the apparatus controller 11 determining that the identification information received by the apparatus input receiving device 12 matches the identification information of the worker transmitted from the server 2 (YES in Step S23), the power supply controller 112 shifts the operation state of the image forming apparatus 1 from the normal power supply mode to the unit replacement mode (Step S24).

As described above, according to the present embodiment, the server 2 transmits the identification information of the worker who is to perform the unit replacement to the image forming apparatus 1 in advance. Upon the image forming apparatus 1 receiving input of the identification information that matches the identification information of the worker transmitted in advance, the power supply controller 112 shifts the operation state from the normal power supply mode to the unit replacement mode. Thus, it is possible to inhibit a component of the replacement unit from being damaged due to the replacement unit being attached or detached while power supply to the replacement unit is maintained, improving the safety for the worker.

The operation controller 110 then causes the display device 13 to display how to replace the replacement unit based on the replacement procedure information (Step S25). Since the replacement procedure is displayed on the display device 13, the worker can know how to replace the replacement unit without preparing an instruction manual or the like.

Next, the unit detection section 113 determines whether or not the unit replacement is finished (Step S26). More specifically, as described with reference to FIG. 3, the unit detection section 113 for example determines that the drum unit replacement is finished when the drum unit 91a is detached, the switch S1 is turned off, a new drum unit is attached, and the switch S1 is turned on.

Upon the unit detection section 113 determining that the unit replacement is finished (YES in Step S26), the power supply controller 112 shifts the operation state to the normal power supply mode (Step S27). The apparatus communication device 15 then transmits, to the server 2, a signal indicating that the unit replacement is finished (Step S28).

Upon the server communication device 24 receiving the signal indicating that the unit replacement is finished, a display (not shown) of the server 2 displays a message indicating that the unit replacement is finished, and a replacement history is stored in the server storage device 25. Storing the replacement history allows the manufacturer or the server administrator to check the history of unit replacement.

As described above, upon the replacement unit detection section 111 detecting a replacement unit, the apparatus communication device 15 transmits unit information of the replacement unit to the server 2, and in response the server 2 transmits, to the image forming apparatus 1, replacement procedure information and identification information of a worker who is to perform the unit replacement. Upon the apparatus input receiving device 12 receiving input of identification information that matches the identification information of the worker received from the server 2, the power supply controller 112 shifts the operation state from the normal power supply mode to the unit replacement mode. Thus, the worker does not need to switch modes of power supply by himself/herself, and therefore can perform the replacement smoothly. Furthermore, since power supply to the replacement unit is stopped, components of the replacement unit can be prevented from being damaged due to over voltage upon attachment or detachment of the replacement unit. Furthermore, the safety for the worker while the worker is replacing the replacement unit can be improved.

Upon the unit detection section 113 determining that the unit replacement is finished, the power supply controller 112 shifts the operation state from the unit replacement mode to the normal power supply mode. Thus, the image forming apparatus 1 can return to normal operation without bothering the worker.

As described above, the display device 13 displays a replacement procedure when a unit is replaced. However, the display device 13 can fail and need to he replaced. In such a case, the operation controller 110 may cause the printer 14 to form an image indicating the replacement procedure on paper. Furthermore, the operation controller 110 may switch between the replacement procedure to be displayed by the display device 13 and the image to be formed by the printer 14 in accordance with an instruction that the worker inputs into the apparatus input receiving device 12.

What is claimed is:

1. An image forming apparatus for forming an image on paper, the image forming apparatus comprising:
a controller configured to detect a replacement unit from among units included in the image forming apparatus, the replacement unit being a unit that needs to he replaced;
a transmitter configured to transmit, to an external device, unit information indicating the replacement unit upon the controller detecting the replacement unit;
a receiver configured to receive, from the external device via a network, replacement procedure information of the replacement unit detected by the controller and identification information of a worker who is to replace the replacement unit;
an input receiving device configured to receive input of identification information of a user; and
an informing device, wherein
upon the input receiving device receiving input of identification information that matches the identification information of the worker received by the receiver, the controller shifts an operation state of the image forming apparatus from a normal power supply mode to a unit replacement mode, the normal power supply mode being a mode in which power is supplied to the entire image forming apparatus, the unit replacement mode being a mode in which power is supplied only to predetermined components of the image forming apparatus other than the replacement unit, and
the controller causes the informing device to inform how to replace the replacement unit based on the replacement procedure information.

2. The image forming apparatus according to claim 1, wherein
the controller determines whether or not the replacement unit has been replaced with a new unit, and
upon determining that the replacement unit has been replaced with the new unit, the controller shifts the operation state to the normal power supply mode.

3. The image forming apparatus according to claim 1, wherein
the informing device includes a display, and
the controller causes the display to display how to replace the replacement unit based on the replacement procedure information.

4. The image forming apparatus according to claim 1, wherein
the informing device includes a printer configured to form an image on paper, and
the controller causes the printer to form on paper an image indicating how to replace the replacement unit based on the replacement procedure information.

5. The image forming apparatus according to claim 1, wherein
the identification information of the worker is prospectively associated with information indicating a model of the image forming apparatus, and the receiver receives the identification information of the worker in association with the model of the image forming apparatus.

6. An image forming system comprising:
a plurality of image forming apparatuses each configured to form an image on paper; and
a server connected with the image forming apparatuses via a network, wherein
each of the image forming apparatuses has:
a controller configured to detect a replacement unit from among units included in the image forming apparatus, the replacement unit being a unit that needs to be replaced;
an apparatus transmitter configured to transmit, to the server, unit information indicating the replacement unit upon the controller detecting the replacement unit;
an apparatus receiver configured to receive, from the server, replacement procedure information of the replacement unit detected by the controller and identification information of a worker who is to replace the replacement unit;
an apparatus input receiving device configured to receive input of identification information of a user; and
an informing device, wherein
upon the apparatus input receiving device receiving input of identification information that matches the identification information of the worker received by the apparatus receiver, the controller shifts an operation state of the image forming apparatus from a normal power supply mode to a unit replacement mode, the normal power supply mode being a mode in which power is supplied to the entire image forming apparatus, the unit replacement mode being a mode in which power is supplied only to predetermined components of the image forming apparatus other than the replacement unit,
the controller causes the informing device to inform how to replace the replacement unit based on the replacement procedure information, and
the server has:
a server receiver configured to receive unit information of the replacement unit from the image forming apparatus; and
a server transmitter configured to transmit, to the image forming apparatus, the replacement procedure information of the replacement unit and the identification information of the worker who is to replace the replacement unit.

7. The image forming system according to claim 6, wherein
the identification information of the worker is prospectively associated with a model of the image forming apparatus, and
the server transmitter transmits the identification information of the worker in association with the model of the image forming apparatus to the image forming apparatus.

* * * * *